United States Patent
Spencer

(10) Patent No.: US 8,463,240 B2
(45) Date of Patent: Jun. 11, 2013

(54) OPTIMIZING MOBILE TERMINATED/MOBILE INITIATED CALL LEGS

(75) Inventor: Bradford Lawrence Spencer, Hammonds Plains (CA)

(73) Assignee: Research In Motion Limited, Waterloo (CA)

( * ) Notice: Subject to any disclaimer, the term of this patent is extended or adjusted under 35 U.S.C. 154(b) by 428 days.

(21) Appl. No.: 12/714,120

(22) Filed: Feb. 26, 2010

(65) Prior Publication Data

US 2011/0212708 A1    Sep. 1, 2011

(51) Int. Cl.
*H04L 12/58* (2006.01)
*H04L 12/56* (2006.01)
*H04M 3/42* (2006.01)

(52) U.S. Cl.
USPC ......... 455/412.1; 455/415; 455/417; 370/352

(58) Field of Classification Search
None
See application file for complete search history.

(56) References Cited

U.S. PATENT DOCUMENTS

| 7,260,403 B1 | 8/2007 | Zhang | |
| 2007/0206563 A1* | 9/2007 | Silver et al. | 370/351 |
| 2008/0200158 A1 | 8/2008 | Harris et al. | |
| 2009/0086953 A1* | 4/2009 | Vendrow | 379/207.02 |
| 2010/0046731 A1 | 2/2010 | Gisby et al. | |

FOREIGN PATENT DOCUMENTS

| EP | 1280080 A1 | 1/2003 |
| EP | 1524830 A2 | 4/2005 |
| WO | 2007103121 A2 | 9/2007 |

OTHER PUBLICATIONS

Extended European Search report mailed Sep. 10, 2010; in corresponding European patent application No. 10154944.2.
Office Action mailed Jan. 8, 2013, in corresponding Canadian patent application No. 2,732,943.

* cited by examiner

*Primary Examiner* — Erika A Washington
(74) *Attorney, Agent, or Firm* — Novak Druce Connolly Bove + Quigg LLP

(57) ABSTRACT

A PBX can receive a call for a mobile device, and can send a message over a data channel to the mobile device indicating such. The mobile device can open a voice channel for the call. The mobile device inspects information about the call, such as calling party information, and using historical information, such as statistics relating to acceptance of calls from that calling party to predict whether a user of the mobile device is likely to answer the call or not. If the mobile device predicts that the user is probably going to answer the call, then the mobile device begins establishing the voice channel before the user answers the call (e.g., by accepting through the user interface). However, if the mobile device predicts that the user is not going to answer the call, then the mobile device waits until the user actually answers the call to begin establishing the voice channel.

21 Claims, 4 Drawing Sheets

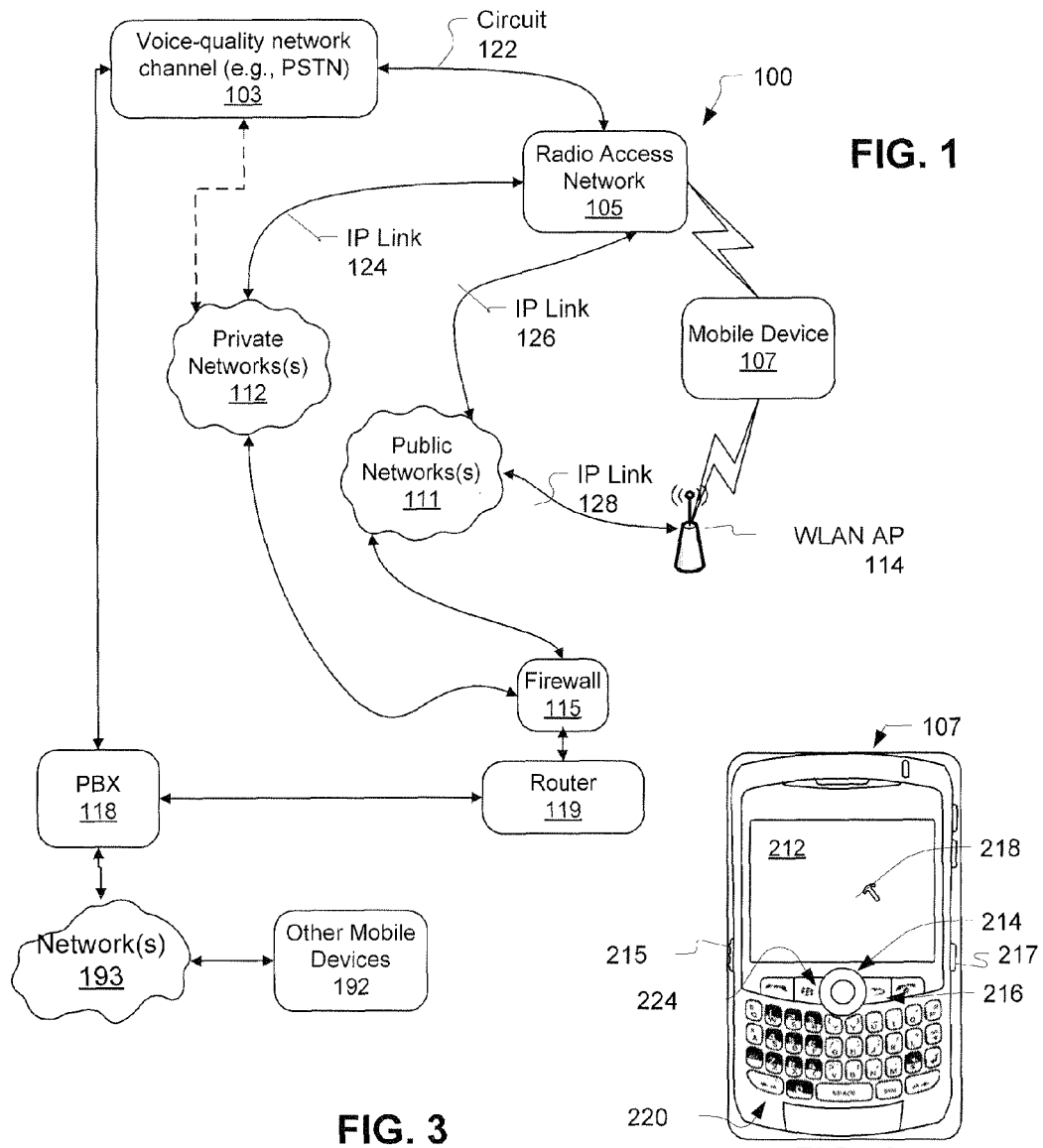

OPTIMIZING MOBILE TERMINATED/MOBILE INITIATED CALL LEGS

BACKGROUND

1. Field

The following relates to mobile telephony, and more particularly to optimization of calls that are terminated or initiated by mobile devices.

2. Related Art

Although much emphasis has been placed, of late, on providing data communication capabilities on mobile phones, voice services and voice communications remain an important feature to be made available on mobile devices.

Mobile devices in many cases continue to be tariffed differently than PSTN-based devices. For example, a mobile device may accrue charges for outgoing calls (e.g., minutes for outgoing calls will be counted against an allocation), while incoming calls do not accrue such charges. Other aspects of a user experience of voice calling on mobile devices include how much delay there is in call establishment. It would be beneficial to continue to improve such user experiences and tailor mobile device voice telephony usage to reduce unnecessary charges.

BRIEF DESCRIPTION OF THE DRAWINGS

FIG. 1 depicts an example system view in which aspects described herein can be practiced;

FIG. 2 depicts an example mobile device view in which aspects described herein can be practiced;

FIG. 3 depicts a schematic example of a switching network that can implement voice channels, which can be used for voice calls, according to the description herein;

DESCRIPTION

Figure 4:
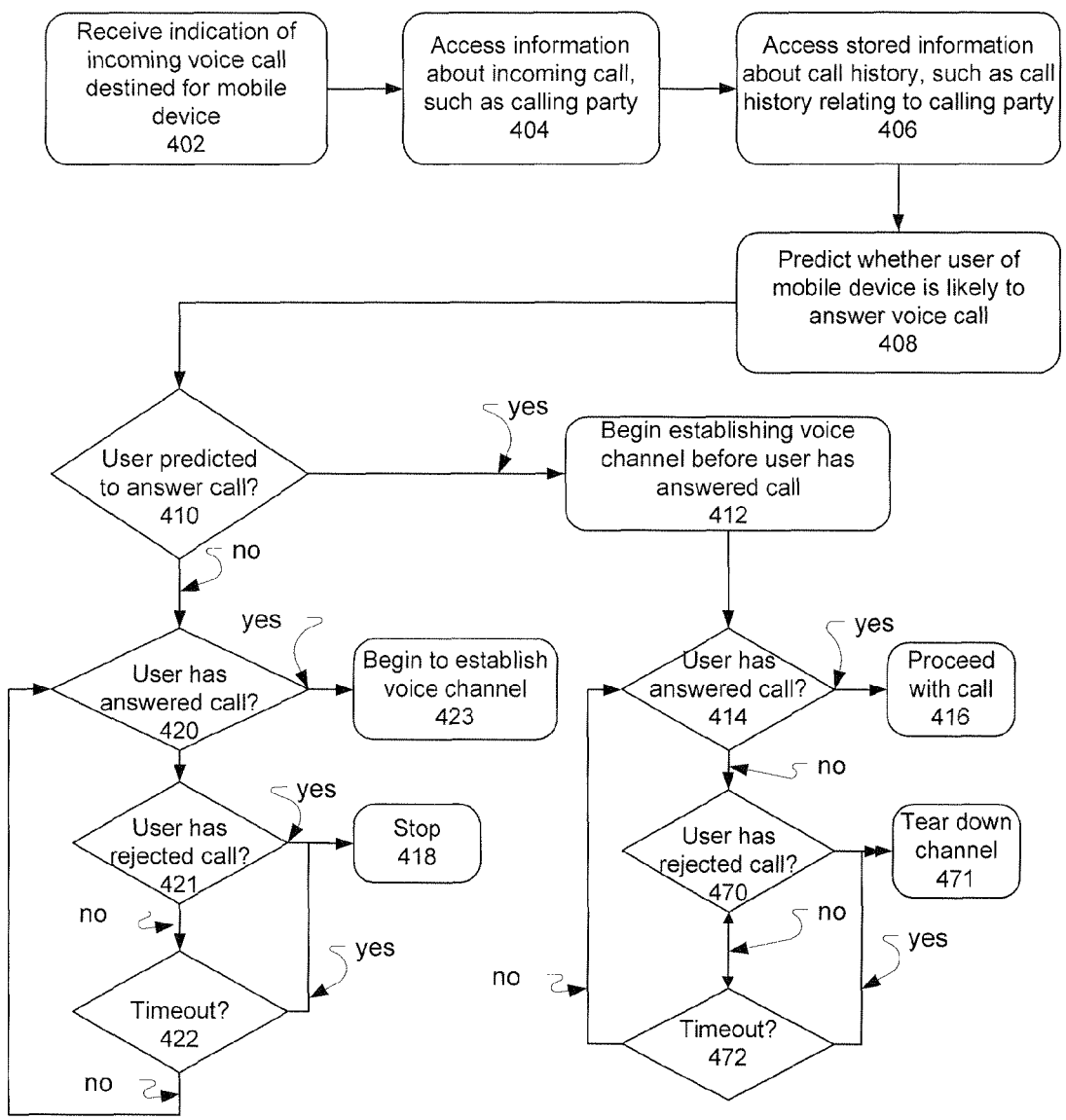
FIG. 4 depicts an example method.

The following description provides examples and other disclosure, which teach those of ordinary skill in the art how to practice implementations of inventive aspects described herein. As such, the description is not limiting, but rather is exemplary.

For convenience, in this description, the terms "mobile phone" and "mobile communications device" generally can be used to refer to any portable or mobile network-enabled device that has capabilities to send and receive voice calls and may also be able to send and receive data, such as data generated by web browsing, e-mail, SMS, instant messaging, and the like. As will become clear, a variety of devices in a variety of form factors can meet such a definition, including, for example, phones, smartphones, laptops configured with appropriate network connections and user input devices, tablet computers, navigation devices embedded in automobiles, and netbooks.

In one example, aspects of this description relate to optimization of mobile terminated/mobile initiated (MTMI) calls. In one system architecture, a system (e.g., a server) can function as a Private Branch eXchange (PBX) for mobile devices, and provide functions such as call forwarding to mobile devices. In one example, the system can receive a call that is to be forwarded to a mobile device. The system can signal, over a data channel to the mobile device, that the system has a call to be forwarded to the mobile device. The mobile device can respond by beginning to initiate a voice channel before the user of the mobile device has indicated that the call is to be accepted (an early call). Alternatively, the mobile device can begin initiation of the voice channel responsive to the user indicating that the call is to be accepted (a late call). In the former case, a delay perceived by the user will be shorter, or possibly even zero. However, the former case also can incur fees and charges, even if the user ignores or rejects the call.

Devices may be pre-configured to perform either early or late calls. However, further optimizations may be available. In one example, information about the calling party (i.e., the party that called the PBX, or more generally, any entity that can receive such calls) and prior history of how the user responded to calls from that party is used to predict whether the user will answer the call. If the prediction is that the user will answer the call, then an early call strategy is used. If the prediction is that the user will not answer the call, a late call strategy is used. A variety of example approaches to making such predictions will be described below.

In the above manner, these aspects can improve user experience, by reducing call setup delay, while avoiding increased costs of early call setup in situations where the user may ultimately not want to have the call established at all.

In a more-specific example, FIG. 1 depicts a system architecture 100 in which a data and voice-enabled mobile device 107 can operate. A Radio Access Network (RAN) 105 provides broadband wireless access to device 107. RAN 105 communicates wirelessly with device 107, and connects device 107 via a circuit 122 with a voice-quality network channel 103. Voice-quality network 103 can serve as a bearer channel for voice calls in which mobile device 107 participates, and can comprise portions of the Public Switched Telephone Network (PSTN).

RAN 105 also can connect through an IP link 124 to private network(s) 112 and through an IP link 126 to public network(s) 111. Usage of IP is exemplary and other addressing systems can be provided. For example, private networks 112 can use X.25 addressing and also can be implemented using Virtual Private Network (VPN) technology to carry data over public networks 111.

Mobile device 107 also can have an interface for communication using local area wireless network technologies, such as 802.11 series technologies. When using such technologies for communication, mobile device 107 typically interfaces with a wireless LAN access point 114, which can communicate over public network(s) 111, such as through a router (not depicted). Communications on this medium also can be addressed using IP, as depicted by labeling the link IP link 128.

Each voice call in which mobile device 107 participates can be terminated at the PBX, or the device 107. A router 119 can communicate with a firewall 115. Firewall 115 can directly communicate to and receive communication from public network(s) 111 and private network(s) 112 that originate from PBX 118, or which otherwise involve signaling concerning voice calls that travels over the data network (such as the data network elements depicted in FIG. 1).

FIG. 1 also depicts the existence of other networks 193 and other devices 192, which can call into PBX 118. The existence of such other devices 192 is for setting context that PBX 118 may be getting any number of incoming voice calls at a given time. For example, a larger PBX, for a company or company site with several thousand employees would be expected to have a large number of calls incoming to the PBX in any given period of time.

Referring to FIG. 2, there is depicted an example of mobile device 107. Mobile device 107 comprises a display 212 and the cursor or view positioning device 214, shown in this implementation as a trackball 214, which may serve as another input member and is both rotational to provide selection inputs and can also be pressed in a direction generally toward housing to provide another selection input. Trackball 214 permits multi-directional positioning of a selection cursor 218, such that the selection cursor 218 can be moved in an upward direction, in a downward direction and, if desired and/or permitted, in any diagonal direction. The trackball 214 is in this example situated on a front face (not separately numbered) of a housing, to enable a user to manoeuvre the trackball 214 while holding mobile device 107 in one hand.

The display 212 may provide that selection cursor 218 depicts generally where the next input or selection will be received. The selection cursor 218 may comprise a box, alteration of an icon or any combination of features that enable the user to identify the currently chosen icon or item. The mobile device 107 in FIG. 2 also comprises a programmable convenience button 215 to activate a selected application such as, for example, a calendar or calculator. Further, mobile device 107 can include an escape or cancel button 216, a camera button 217, a menu or option button 224 and a keyboard 220. Camera button 217 is able to activate photo-capturing functions when pressed preferably in the direction towards the housing. Menu or option button 224 loads a menu or list of options on display 212 when pressed. In this example, the escape or cancel button 216, menu option button 224, and keyboard 220 are disposed on the front face of the mobile device housing, while the convenience button 215 and camera button 217 are disposed at the side of the housing. This button placement enables a user to operate these buttons while holding mobile device 107 in one hand. The keyboard 220 is, in this example, a standard QWERTY keyboard.

FIG. 3 depicts a simplified example of how a voice channel may be setup, over the voice network 103 depicted in FIG. 1. FIG. 3 depicts that voice network 103 may comprise a number of switches (e.g., SS7 switches 192*a-f*), which, based on signaling, can be used to establish a circuit between an ingress point and an egress point from network 103. As depicted, a selection of the switches, such as SS7 switches 192*b*, 192*c* and 192*e* are used in making circuit 122. The selection of appropriate switches, allocation of resources at those switches, and the establishment of connections among the switches can take time, which can result in a perceived delay to begin using the circuit 122 for voice communication.

FIG. 4 depicts a method in which a predictive setup of such a voice channel is begun for a call incoming to a mobile device, before there has been an actual disposition of the incoming call (e.g., an ignore or answer disposition). In particular, FIG. 4 depicts that an indication of an available incoming call destined for a mobile device is received (402). For example, when PBX 118 has received a call (an "incoming call") to be forwarded to mobile device 107, PBX 118 can arrange for an indication of such incoming call to be sent to device 107 over a data channel, such as through router 119 and over any of the networks depicted in FIG. 1 (such as public network 111 or private network 112).

Information about the incoming call is accessed (404). For example, ANI or caller-ID information, which identifies a calling party placing the incoming call, can be accessed. This data can be presented over a data channel that signaled the availability of the call.

Information about history of call disposition is then accessed (406). Such information can include information about a number of calls that have been placed by the calling party to the mobile device, a number of calls from the calling party that have been answered at the mobile device, a number of calls in total that have been placed to the mobile device, and a number of calls in total that have been answered at the mobile device, for example. Based on this stored information and the calling party information, a prediction (408) whether the user at the mobile device is likely to answer the incoming call is made. Further aspects of such prediction are described with respect to FIGS. 5-9; however, by way of brief example, if a ratio of the calls answered versus the total number of calls incoming from the calling party is low (i.e., the user rarely answers the phone when this calling party calls), then the prediction would be that the user will not answer the phone at this time.

Based on the prediction, a decision (410) is made as to whether to begin establishing (412) a voice channel to be used for the voice call or not. In particular, if the user was predicted to answer, then the voice channel establishment will be started. Otherwise, FIG. 4 depicts that the method will await a disposition of the call by the user. Such disposition, in this example, can comprise a determination whether the user has answered (420) the call, and if so, then voice channel establishment can begin (423). If the user has not yet answered, then a decision can be made as to whether the user selected to ignore/reject (421) the call. If the user rejected the call, then the method can stop (418), or take another suitable action. A timeout decision (422) can be made, which in the occurrence of a timeout, can also cause the method to stop (418). Otherwise, a loop to again determine whether user has answered (420) can be provided.

Returning to the response to predicting that the user will answer (408, 410, 412), the method also can check whether the call has been answered (414), and if so, then the call can proceed (416). If the call has been rejected/ignored (470) or there was a timeout (472), then the voice channel which was begun can be torn down (471). Otherwise, there can be a loop to again determine whether user has answered (414).

The method of FIG. 4 depicts an example approach to implementing the predictive aspects disclosed herein. A logically equivalent method may be provided by those of ordinary skill in the art that would differ from an order or arrangement of the elements depicted in FIG. 4.

The methods depicted in FIGS. 5-9 relate to more specific examples of how call disposition predictions can be made. These examples also are by way of explanation, rather than limitation, as those of ordinary skill in the art would be able to provide other call disposition predictive mechanisms based on these disclosures.

Figure 5:
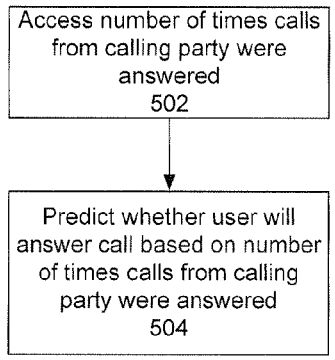
FIGS. 5-9 depict example methods which can be used for call acceptance prediction, as depicted in FIG. 4.

FIG. 5 depicts that one approach to call disposition prediction can include accessing (502), such as from a memory, data representative of a number of times that calls from the calling party were answered, and predicting (504) whether the user will answer based on such number. For example, if there were prior calls from the calling party, but none were answered, then the prediction can be that the user will not answer this call either.

Figure 6:
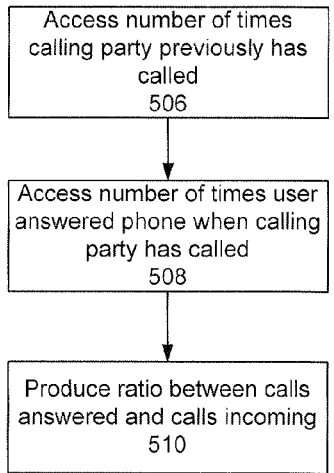

FIG. 6 depicts that another method can involve accessing a number of times that the calling party has called (506), accessing a number of times that the user answered when the calling party called (508), producing a ratio between the answers and the total (510) and predicting (512) whether the user will answer the call based on the ratio. For example, if the ratio indicates that more than half of the calls were answered, then this call will be predicted to be answered.

Figure 7:
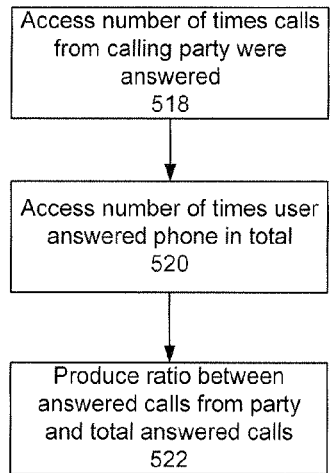

FIG. 7 depicts another prediction method, in which stored information concerning a number of times calls from the calling party were answered can be accessed (518). Other information that can be accessed (520) relates to a number of times, in total, that the user answered the phone. A ratio between the number of calls answered from the calling party to the total number of answered calls can be produced (522), and a prediction is made (524) based on that ratio.

Figure 8:
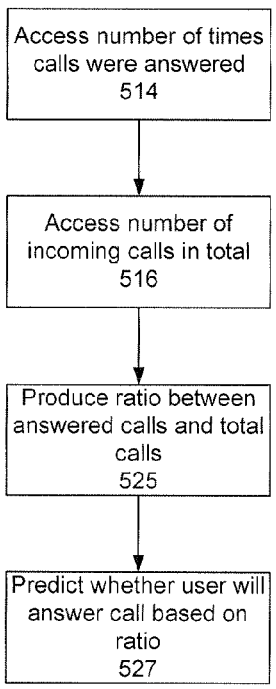

FIG. 8 depicts another prediction method in which a number of times that calls were answered is accessed (514); a number of incoming calls in total is accessed (516), a ratio between such total number of calls answered and number of incoming calls in total is produced (525), and a prediction made based on that ratio (527).

Figure 9:
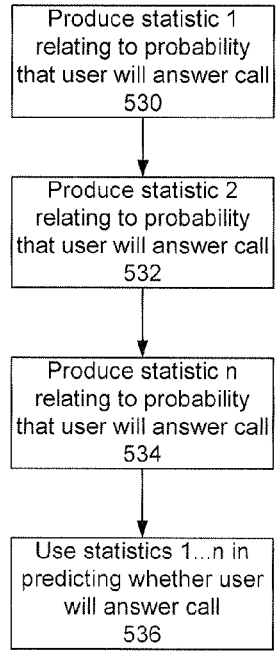

Each of the above ratios, and more generally, the comparisons between the data elements described, can be viewed as a statistic that can be used in predicting whether the user will answer the phone for a given incoming call. FIG. 9 depicts that multiple such statistics can be used in forming such a prediction.

In particular, FIG. 9 depicts that a statistics 1 . . . n can be produced (steps 530, 532, and 534) and those statistics can be used in making a prediction (536) about whether the call will be answered. For example, each of the ratios described with respect to FIGS. 6-8 can be a statistic used in the method of FIG. 9.

Figure 10:
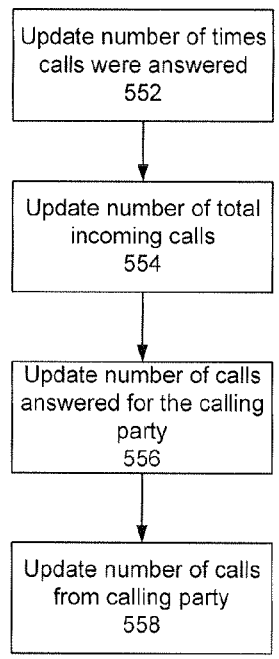
FIG. 10 depicts a method of maintaining information to be used in call acceptance prediction.

FIG. 10 depicts that the data that can be used in producing the statistics or otherwise making the predictions described with respect to FIGS. 4-9 can be gathered and maintained. In particular, a number of incoming calls can be updated (554), and a number of calls from the calling party can be updated (558), regardless of disposition of the incoming call. If the call was answered, then a total number of calls answered can be updated (552), as can a total number of calls answered from the calling party (556). These updated numbers can then be used for predictive purposes during for future incoming calls. The data can be stored as raw numbers, or some of the ratios described can be precomputed and stored. Still further, the prediction can be made in advance based on the data, and the prediction stored. For example, a flag can be stored with identifying information for a particular calling party that indicates to answer or ignore the next call from this particular calling party. Such data can be stored on the mobile device, in the network, on PBX 118, or in another suitable location.

Figure 11:
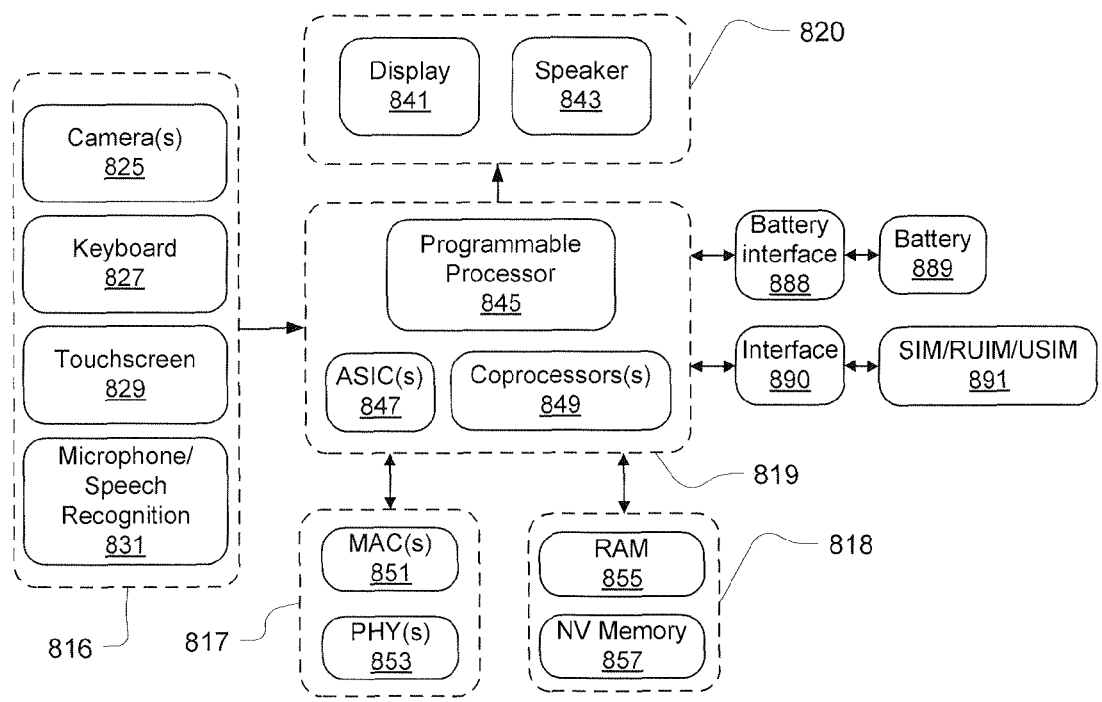
FIG. 11 depicts an example composition of a mobile device, such as that illustrated in FIG. 2.

FIG. 11 depicts an example composition of a device which can perform the method aspects described above in processing resources, as well as store, or otherwise have access to a computer readable medium that stores code for configuring processing resources to perform such methods.

By particular example, FIG. 11 depicts that device 107 can be provided with components as follows. Device 107 can have a variety of components by which user input can be received, including a camera 825, a keyboard 827, a touch screen 829, and a microphone 831 that can be used for speech recognition, for example (collectively, input sources 816). These ways of receiving user input can be processed and ultimately coupled with processing resource 819 that can be comprised of a plurality of components, such as a programmable processor 845, one or more ASICs 847, as well as other co-processors 849. For example, an ASIC or co-processor may be provided for implementing graphics functionality, encryption and decryption, audio filtering, and other such functions that often involve many repetitive, math-intensive steps. Processing resource 819 also may interface with one or more network interfaces 817, each of which may be comprised of one or more Media Access Controllers (MACs) 851, which in turn interface with physical layers 853.

Processing resource 819 also may interface with a memory resource 818 which may be comprised of a plurality of memories, including a RAM 855, and a non-volatile memory 857, which can be implemented with one or more of Flash memory, PROM, EPROM, and so on. Non-volatile memory 857 can be implemented as flash memory, ferromagnetic, phase-change memory, and other non-volatile memory technologies. Non-volatile memory 857 also can store programs, device state, various user information, one or more operating systems, device configuration data, and other data that may need to be accessed persistently. Such memory 818 can be used for storing the call history, statistics, and/or flags, which were described with respect to the method aspects above.

Processing resource 819 also may interface with user output 820 components, which can include a display 841, as well as a speaker 843, which can be used for text to speech or for performing audio, more generally.

A battery interface 888 interfaces a battery 889 with processing resource 819. Battery interface 888 can provide battery status updates and manage recharging of the battery, for example. Processing resource 819 also can couple, through an interface 890, with a SIM/RUIM/USIM 891, to enable communication over protocols that would use each.

Aspects described above can be implemented as computer executable code modules that can be stored on computer readable media, read by one or more processors, and executed thereon. Such computer readable media can be read by such processors over a network, which can be implemented using wired and wireless network technologies. In addition, separate boxes or illustrated separation of functional elements of illustrated systems does not necessarily require physical separation of such functions, as communications between such elements can occur by way of messaging, function calls, shared memory space, and so on, without any such physical separation.

Although certain disclosures were provided with respect to certain portions of the figures and in certain examples, the structures or functions disclosed therein can be used or adapted for use with the structures or functions disclosed with respect to other portions of the disclosures and figures. More generally, a person of ordinary skill would be able to adapt these disclosures to implementations of any of a variety of communication devices. Similarly, a person of ordinary skill would be able to use these disclosures to produce implementations on different physical platforms or form factors without deviating from the scope of the claims and their equivalents.

I claim:

1. A method of determining whether to establish a voice channel between a communications device and an external communications network, the communications device being configured to communicate over a data channel and the voice channel, the method comprising:

receiving, at the communications device, telephone call information over the data channel, the data channel being different from the voice channel;

obtaining, via a processor of the communications device, a telephone call history of the voice channel associated with the communications device;

analyzing the telephone call history and the telephone call information to predict whether a call acceptance signal will be generated at the communication device, the call acceptance signal initiating the voice channel;

initiating the voice channel in an early call setup based upon predicting the call acceptance signal will be generated at the communication device, the voice channel being initiated prior to generating the call acceptance signal at the communication device; and initiating the voice channel in a late call setup based upon predicting the call acceptance signal will not be generated at the communication device, the voice channel being initiated upon generating the call acceptance signal at the communication device.

2. The method of claim 1, wherein receiving the telephone call information over the data channel includes receiving caller identification information.

3. The method of claim 1, wherein obtaining the telephone call history associated with the communications device includes obtaining a call disposition.

4. The method of claim 3, wherein the call disposition includes at least one of a number of telephone calls placed by a calling party to the communications device, a number of calls from the calling party that have been answered at the communications device, a number of calls from the calling party that have been ignored at the communications device, and a number of calls in total that have been placed to the communications device.

5. The method of claim 1, further comprising generating the call acceptance signal upon actuation of an answer button on the communications device.

6. The method of claim 1, wherein the voice channel is initiated by the communications device to access the external communications network.

7. The method of claim 1, wherein the external communications network is a private branch exchange, the method further comprises:
determining if a timeout condition is satisfied; and
terminating initiation of the voice channel when the timeout condition is satisfied.

8. A communications device that communicates over a data channel and a voice channel, the communications device being configured to determine whether to establish the voice channel between the communications device and an external communications network, the communications device comprising:
a non-transitory storage device having instructions stored thereon;
a processor in data communication with non-transitory storage device, the processor configured to:
receive telephone call information over the data channel, the data channel being different from the voice channel;
obtain a telephone call history of the voice channel associated with the communications device;
analyze the telephone call history and the telephone call information to predict whether a call acceptance signal will be generated at the communication device, the call acceptance signal initiating the voice channel;
initiate the voice channel in an early call setup based upon predicting the call acceptance signal will be generated at the communication device, the voice channel being initiated prior to generating the call acceptance signal at the communication device; and
initiate the voice channel in a late call setup based upon predicting the call acceptance signal will not be generated at the communication device, the voice channel being initiated upon generating the call acceptance signal at the communication device.

9. The communications device of claim 8, wherein the telephone call information received over the data channel includes caller identification information.

10. The communications device of claim 8, wherein the telephone call history associated with the communications device includes a call disposition.

11. The communications device of claim 10, wherein the call disposition includes at least one of a number of telephone calls placed by a calling party to the communications device, a number of calls from the calling party that have been answered at the communications device, a number of calls from the calling party that have been ignored at the communications device, and a number of calls in total that have been placed to the communications device.

12. The communications device of claim 8, further comprising an answer button that is actuated to generate the call acceptance signal.

13. The communications device of claim 8, wherein the voice channel is initiated by the communications device to access the external communications network, the external communications network being a private branch exchange.

14. The communications device of claim 8, wherein the processor is further configured to:
determine if a timeout condition has been satisfied; and
terminate initiation of the voice channel when the timeout condition is satisfied.

15. A non-transitory memory storing instructions for execution by a processor on a communications device to determine whether to establish a voice channel between the communications device and an external communications network, the communications device being configured to communicate over a data channel and the voice channel, the instruction are executable to:
receive telephone call information over the data channel, the data channel being different from the voice channel;
obtain a telephone call history of the voice channel associated with the communications device;
analyze the telephone call history and the telephone call information to predict whether a call acceptance signal will be generated at the communication device, the call acceptance signal initiating the voice channel;
initiate the voice channel in an early call setup based upon predicting the call acceptance signal will be generated at the communication device, the voice channel being initiated prior to generating the call acceptance signal at the communication device; and
initiate the voice channel in a late call setup based upon predicting the call acceptance signal will not be generated at the communication device, the voice channel being initiated upon generating the call acceptance signal at the communication device.

16. The non-transitory memory of claim 15, wherein the telephone call information received over the data channel includes caller identification information.

17. The non-transitory memory of claim 15, wherein the telephone call history associated with the communications device includes a call disposition.

18. The non-transitory memory of claim 17, wherein the call disposition includes at least one of a number of telephone calls placed by a calling party to the communications device, a number of calls from the calling party that have been answered at the communications device, a number of calls from the calling party that have been ignored at the communications device, and a number of calls in total that have been placed to the communications device.

19. The non-transitory memory of claim 15, including instructions that are executable to generate the call acceptance signal upon actuation of an answer button on the communications device.

20. The non-transitory memory of claim 15, including instructions that are executable to initiate the voice channel at the communications device to access the external communications network.

21. The non-transitory memory of claim 15, further storing instructions that are executable to determine if a timeout condition has been satisfied and terminate initiation of the voice channel when the timeout condition is satisfied.

* * * * *